Oct. 13, 1942.   H. C. BOWEN   2,298,856
FLUID PRESSURE BRAKING SYSTEM
Original Filed Sept. 20, 1937
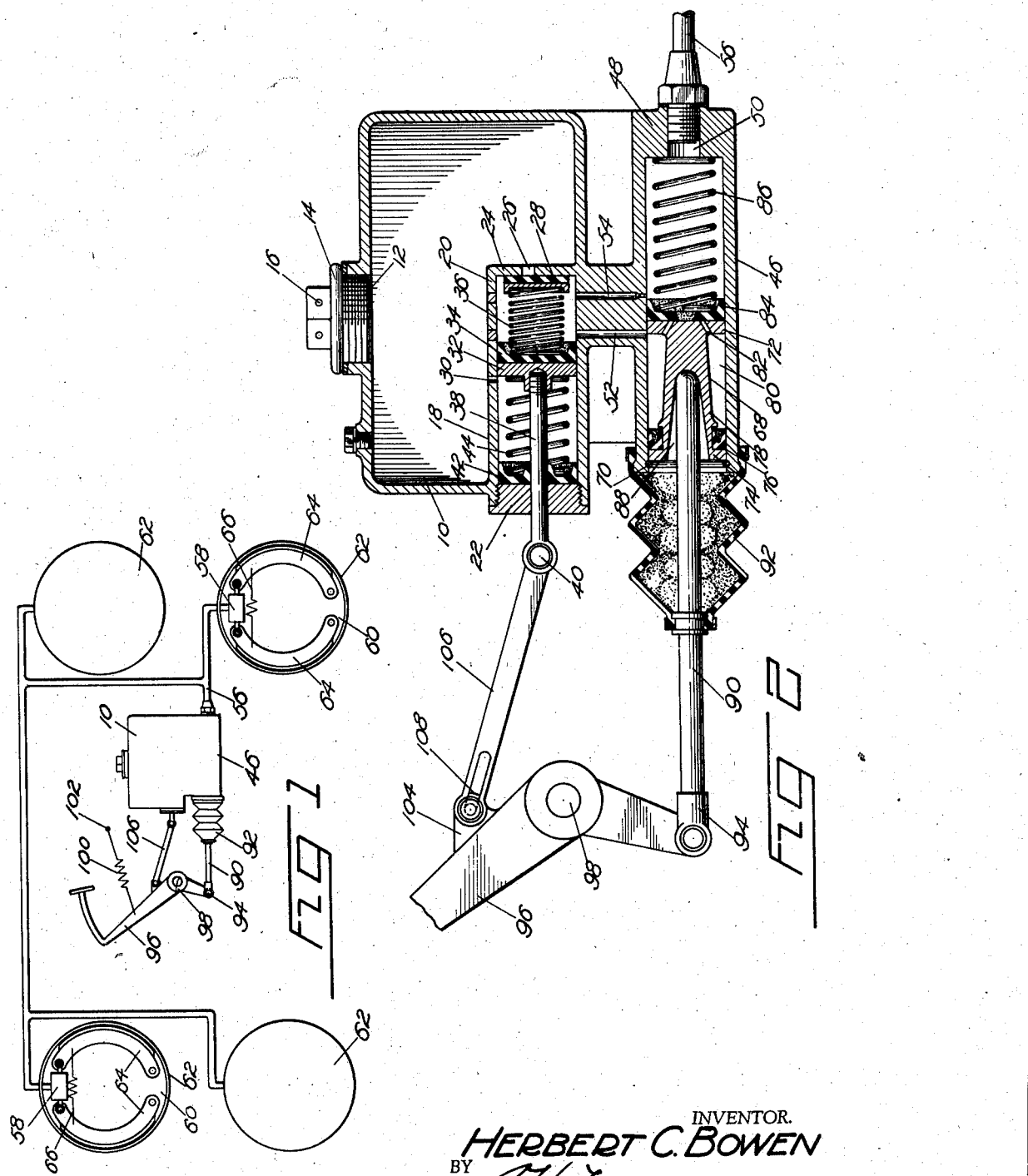
INVENTOR.
HERBERT C. BOWEN
BY
ATTORNEY.

Patented Oct. 13, 1942

2,298,856

UNITED STATES PATENT OFFICE 2,298,856

FLUID PRESSURE BRAKING SYSTEM

Herbert C. Bowen, Detroit, Mich., assignor to Hydraulic Brake Company, Detroit, Mich., a corporation of California Original application September 20, 1937, Serial No. 164,636, now Patent No. 2,201,518, dated November 21, 1939. Divided and this application December 14, 1939, Serial No. 309,251

2 Claims. (Cl. 60—54.6)

This invention relates to fluid pressure braking systems.

The instant application is a division of my co-pending application, Ser. No. 164,636, filed Sept. 20, 1937, now Patent No. 2,201,518 issued November 21, 1939, and is made in accordance with requirements of the United States Patent Office under provision of Rule 42.

An object of the invention is to provide a fluid pressure braking system including a fluid pressure producing device operative to maintain a predetermined pressure on the fluid in the system so as to exclude air from the system.

Another object of the invention is to provide a fluid pressure producing device operative to automatically raise the pressure on the fluid in the system when the pressure drops from a predetermined degree.

Other objects and advantages of the invention will appear from the following description taken in connection with the drawing forming a part of this specification, and in which—

Fig. 1 is a schematic view of a fluid pressure braking system embodying the invention; and Fig. 2 is a vertical sectional view of the fluid pressure producing device.

Referring to the drawing for more specific details of the invention, 10 represents a fluid reservoir having a filling opening 12 normally closed as by a plug 14 having openings 16 therethrough for venting the reservoir to the atmosphere.

A fluid pump 18 in the bottom of the reservoir includes a cylinder 20 having one of its ends opening through the wall of the reservoir and closed as by a head 22, and its other end closed by a head 24 having a port 26 providing a communication between the cylinder 20 and the reservoir, and a valve 28 is seated on the head 24 for control of the port 26. The cylinder 20 also has in its wall a port 30 providing another communication between the cylinder and the reservoir.

A piston 32 reciprocable in the cylinder 20 between the ports 26 and 30 has on its head a sealing cup 34, and a light spring 36 interposed between the cup 34 and the valve 28 serves to retain the valve and cup against displacement. A rod 38 attached to the piston extends through an opening in the head 22 of the cylinder and terminates in a clevis 40. A sealing washer 42 sleeved on the rod 38 and seated on the head 22 of the cylinder inhibits seepage of fluid from the cylinder past the rod, and a spring 44 sleeved over the rod between the sealing washer 42 and the back of the piston 32 serves to retain the washer against displacement and also to impose a predetermined load on the piston 32 commensurate with the pressure desired on the fluid in the system.

A cylinder 46 depending from the bottom of the reservoir has one of its ends open and its other end closed as by a head 48 provided with a discharge port 50, and arranged in the wall of the cylinder are spaced ports 52 and 54 providing communications between the cylinder 46 and the cylinder 20 of the fluid pump.

A fluid pressure delivery pipe or conduit 56 connected to the discharge port 50 has branches connected respectively to fluid pressure actuated motors 58, preferably arranged in pairs, one pair for actuating brakes associated with the rear wheels of a motor vehicle, and another pair for actuating brakes associated with the front wheels of the vehicle.

The brakes may be of conventional type. As shown, each brake includes a fixed support or backing plate 60, a rotatable drum 62 associated with the backing plate, a pair of corresponding friction elements or shoes 64 mounted on the backing plate for cooperation with the drum, a retractile spring 66 connecting the shoes, and a motor corresponding to the motors 58 mounted on the backing plate between the shoes and operative to actuate the shoes into engagement with the drum against the resistance of the retractile spring.

A piston 68 reciprocable in the cylinder 46 is held against displacement by a retaining ring 70 seated in a groove in the wall of the cylinder adjacent the open end of the cylinder. The piston 68 includes a head 72, a skirt 74 supporting a sealing cup 76 for inhibiting seepage of fluid from the cylinder past the piston, and a reduced body portion 78 providing in conjunction with the wall of the cylinder an annular chamber 80 communicating with the cylinder 20 of the fluid pump as by way of the port 52.

The head of the piston 68 has a plurality of passages 82 therethrough providing communications between the annular chamber 80 and that portion of the cylinder forward of the piston 68. A sealing cup 84 on the head of the piston 68 controls the passages 82, and a spring 86 interposed between the cup and the head 48 of the cylinder serves to retain the cup against displacement and also to return the piston to its retracted position.

A recess 88 in the back of the piston 68 receives one end of a thrust rod 90. The rod has suitably secured thereon a flexible boot 92 connected to the open end of the cylinder for the exclusion of dust and other foreign substances, and on the other end of the thrust rod is a clevis 94. A foot pedal lever 96 of conventional type is rockably mounted on a stub shaft 98 and connected by a retractile spring 100 to a fixed support 102. The foot pedal lever is pivotally connected to the clevis 94 on the thrust rod 90, and a lug 104 on the foot pedal lever is attached to one end of a link 106 by an overrunning connection 108, and the other end of the link 106 is pivotally connected to the clevis 40 on the piston rod 38 of the fluid pump 18.

In a normal operation, upon depressing the foot pedal lever 96, force is transmitted therefrom through the thrust rod 90 to the piston 68, resulting in movement of this piston on its compression stroke. During the initial movement of the piston, the cup 84 on the head of the piston covers the port 54, and, thereafter, as the piston advances on its compression stroke, fluid in the cylinder 46 forward of the piston is displaced therefrom through the discharge port 50 and the fluid pressure delivery pipe 56 and its branches into the fluid pressure actuated motors 58 connected between the friction elements 64 of the brakes. This results in energization of the motors and the consequent actuation of the friction elements into engagement with the drums against the resistance of the retractile springs to effectively retard rotation of the drum.

Upon concluding a braking operation, the foot pedal lever 96 is released and is returned to retracted position under the influence of the retractile spring 100. This movement of the foot pedal lever retracts the thrust pin 90 and releases the piston 68, whereupon the spring 86 becomes effective to return the piston to its retracted position.

As the piston 68 returns to its retracted position, a partial vacuum is created in the cylinder 46 forward of the piston. This results in drawing fluid from the pump cylinder 20, through the port 52, into the annular chamber 80, thence through the passages 82 in the head of the piston 68, past the cup 84 on the head of the piston, into that portion of the cylinder forward of the piston, completely filling the cylinder.

This may result in a slight movement of the piston 32 of the pump under the influence of the spring 44, due to displacement of fluid from the pump cylinder 20. However, during this period, fluid is returning to the cylinder 46 from the fluid pressure actuated motors and the fluid pressure delivery piping system connecting the motors to the cylinder under the influence of the retractile springs connected between the friction elements of the respective brake structures. Accordingly, the pressure on the fluid in the system is maintained fairly constant.

Should there occur a drop in the pressure on the fluid in the system, the piston 32 of the fluid pump is moved under the influence of the spring 44, and this movement of the piston 32 results in taking up the overrunning connection 108 and the consequent actuation of the piston 32 against the resistance of the spring 44 upon actuation of the foot pedal lever during a normal actuation of the brakes. This actuation of the pump piston 32 draws fluid from the reservoir, past the valve 28, into the pump cylinder 20. Should the quantity of fluid drawn into the cylinder be in excess of that required to maintain a desired pressure on the fluid in the system, the piston 32 is moved against the resistance of the spring 44 to uncover the port 30 so that a portion of the fluid may be returned to the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a fluid pressure braking system including a reservoir, a fluid pressure producing device supplied therefrom and means for actuating the device, a pump in the reservoir below the fluid level including a chamber having an inlet communicating with the reservoir and outlets in continuously open communication with the pressure producing device, a piston reciprocable in the chamber, a spring imposing a load on the piston, and means connecting the piston to the actuating means including an overrunning connection for automatically operating the piston to maintain a positive pressure on the fluid in the system, said inlet controlled by a valve in the pump chamber spring-loaded by the piston to normally inhibit passage of fluid therethrough.

2. In a fluid pressure producing device comprising a reservoir, a cylinder associated therewith, a piston movable in the cylinder for creating pressure, an actuator for the piston, a pump in the base of the reservoir including a chamber having an inlet communicating with the reservoir and outlets communicating respectively with the cylinder and the reservoir, a spring-loaded piston reciprocable in the chamber controlling the outlet communication between the pump and reservoir, a spring-pressed valve in the pump chamber for controlling the inlet communication of the chamber, the outlet communication between the pump and cylinder being continuously open, and means including an overrunning connection for coupling the actuating means to the piston reciprocable in the chamber for operation thereby when the pressure on the fluid in the device drops below a predeteremined degree.

HERBERT C. BOWEN.